US007286722B2

(12) United States Patent
Fujimoto et al.

(10) Patent No.: US 7,286,722 B2
(45) Date of Patent: Oct. 23, 2007

(54) MEMO IMAGE MANAGING APPARATUS, MEMO IMAGE MANAGING SYSTEM AND MEMO IMAGE MANAGING METHOD

(75) Inventors: Katsuhito Fujimoto, Kawasaki (JP); Atsuko Ohara, Kawasaki (JP); Satoshi Naoi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 814 days.

(21) Appl. No.: 10/465,596

(22) Filed: Jun. 20, 2003

(65) Prior Publication Data
US 2004/0019585 A1    Jan. 29, 2004

(30) Foreign Application Priority Data
Jul. 8, 2002    (JP)    ............................. 2002-198367

(51) Int. Cl.
*G06K 9/60* (2006.01)
(52) U.S. Cl. ...................... 382/305; 382/187; 382/190; 382/313; 345/733; 345/751; 709/218; 709/219
(58) Field of Classification Search ................ 382/177, 382/190, 282, 305, 187, 313; 345/736, 738, 345/733, 751; 709/218, 219
See application file for complete search history.

(56) References Cited
U.S. PATENT DOCUMENTS

| | | | | | |
|---|---|---|---|---|---|
| 5,215,397 | A | * | 6/1993 | Taguchi et al. ............. | 401/194 |
| 5,530,740 | A | * | 6/1996 | Irribarren et al. ......... | 379/88.17 |
| 5,574,804 | A | * | 11/1996 | Olschafskie et al. ........ | 382/313 |
| 5,604,788 | A | * | 2/1997 | Tett .......................... | 455/412.1 |
| 5,913,162 | A | * | 6/1999 | Gourdin et al. ............. | 455/424 |
| 5,933,478 | A | * | 8/1999 | Ozaki et al. .............. | 379/93.24 |
| 6,269,394 | B1 | * | 7/2001 | Kenner et al. .............. | 709/217 |
| 6,351,645 | B1 | * | 2/2002 | Suzuki et al. ............... | 455/458 |
| 6,611,598 | B1 | * | 8/2003 | Hayosh ........................ | 380/54 |
| 6,618,504 | B1 | * | 9/2003 | Yoshino ..................... | 382/187 |
| 6,714,209 | B2 | * | 3/2004 | Van Valer .................... | 345/629 |
| 6,970,609 | B2 | * | 11/2005 | Sakai et al. ................. | 382/305 |

\* cited by examiner

*Primary Examiner*—Yosef Kassa
(74) *Attorney, Agent, or Firm*—Staas & Halsey LLP

(57) ABSTRACT

Herein disclosed is a memo image managing apparatus, system and method which are adapted to manage and retrieve a large amount of memo images. The memo image managing apparatus that is connectable to a portable terminal capable of performing a memo image exchange and a memo image display comprises: a managing server adapted to manage memo images and a character information recognizing server adapted to recognize character information of the memo image. The managing server is comprised of a memo image accumulating section adapted to accumulate memo images and a memo image retrieving section adapted to retrieve a predetermined memo image from the accumulated memo images in response to a request. The character information recognizing server is comprised of a character information recognizing section adapted to recognize character information from the memo image.

20 Claims, 7 Drawing Sheets

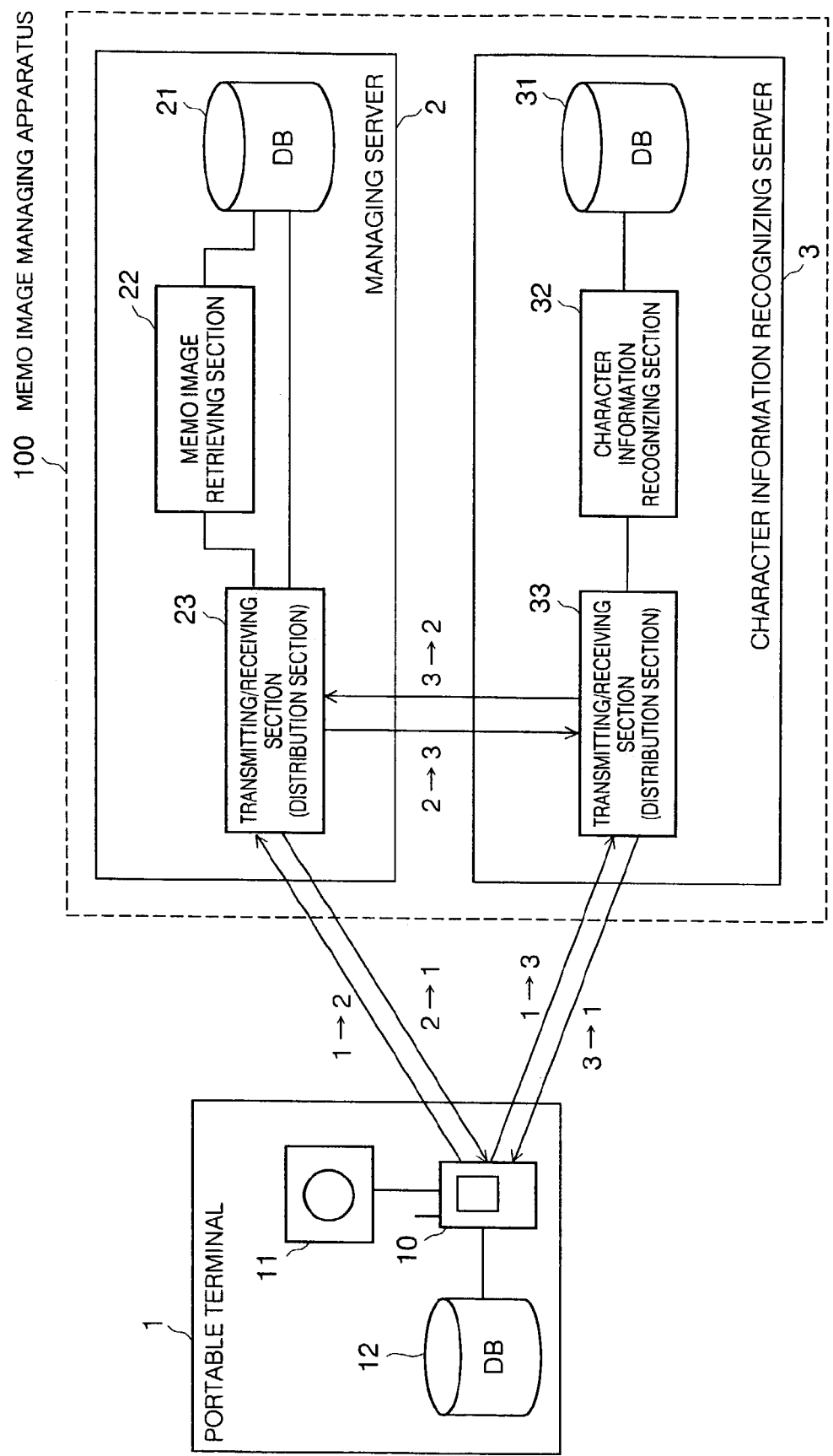

Fig. 4

| NO. | DATE AND HOUR | ITEM 1 | ITEM 2 | ... | IMAGE | TEXT | OPEN MODE | ... |
|---|---|---|---|---|---|---|---|---|
| 090-xxx | 01. 5.11 | HOSPITAL | KAWASAKI | ... | 111.jpg | 111.txt | 1 | |
| 090-xxx | 01.10.12 | HOSPITAL | KAWASAKI | ... | 112.jpg | 112.txt | 1 | |
| 090-xxx | 02. 1. 5 | EDUCATION | TOKYO | ... | 113.jpg | 113.txt | 2 | |
| 090-xxx | 02. 4. 6 | EDUCATION | TOKYO | ... | 114.jpg | 114.txt | 3 | |
| 090-xxx | 02. 5.15 | EXERCISE | YOKOHAMA | ... | 115.jpg | 115.txt | 1 | |

Fig.5(a) Fig.5(b)
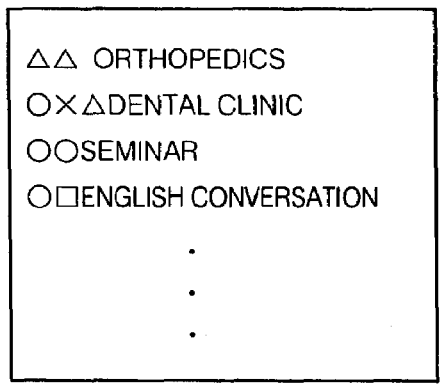
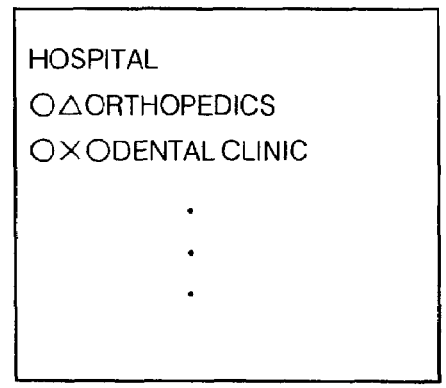
Fig. 6
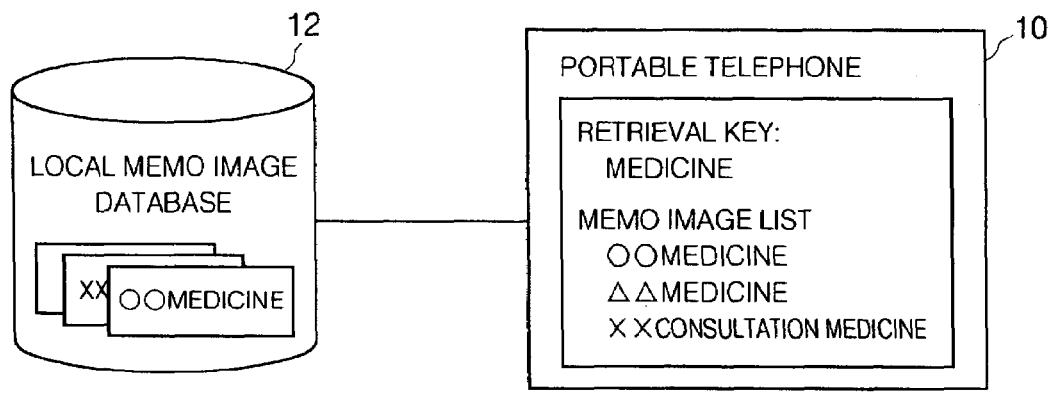
Fig. 7

(EXAMPLE OF THUMBNAIL PRESENTATION)

MEMO IMAGE REGISTRATION FLOW

MEMO IMAGE MANAGING APPARATUS, MEMO IMAGE MANAGING SYSTEM AND MEMO IMAGE MANAGING METHOD

BACKGROUND OF THE INVENTION

1. Field of the Invention

The present invention relates to a memo image managing apparatus, a memo image managing system and a memo image managing method, and particularly relates to a managing medium adapted to manage memo images captured from a portable terminal (information appliance) such as a portable telephone, a PHS or the like.

2. Description of the Related Art

Recently, a portable terminal such as a portable telephone, a PHS or the like equipped with capability of transmitting and receiving a digital image has become popular. Further, there are well known information appliances each comprising a built-in digital camera or an interface connectable to a compact digital camera. Such a digital camera which is embedded into or connectable to the portable terminal is useful in a variety of different scenes. In particular, it is known as its one application that the camera is used for capturing information about an environment thereof as a memo.

For example, as a first conventional art, Japanese Patent Laid-Open Publication No. HE-10-276274 describes a telephone device capable of acquiring character information from an image data by the character recognition.

Also, as a second conventional art, Japanese Patent Laid-Open Publication No. HE-05-22555 and Japanese Patent Laid-Open Publication No. HE-06-339003 respectively describe communication systems, each being capable of extracting address information such as a telephone number from an image data acquired by the character recognition function equipped in a terminal device and automatically transmitting it.

Moreover, as a third convention art, there are known Japanese Patent Laid-Open Publication No. HE-11-205515 (a communication system, a controlling method thereof and a computer-readable memory) and Japanese Patent Laid-Open Publication No. HE-10-210167 (a data registering method in a communication system, a communication system and a communication apparatus), each describing that the exchange of images between a portable telephone and a host station is enabled and character information can be extracted from an image by equipping the host station with the character recognition function.

The first conventional art as described above uses a portable terminal as a standalone, as a result of which an amount of memo images which can be stored and processed is inconveniently restrained small. Also, this portable terminal has difficulty in causing memo images which have been collected by a user to be shared more widely with the third persons. Specifically, in the event that an exchange of memo images among other users by using these portable terminals is performed, the users must communicate with one another in a one-to-one relationship for the exchange of memo images. Accordingly, it is impossible to simultaneously exchange memo images among a plurality of users, so that the exchange of memo images can not be popularized.

The second conventional art disadvantageously limits information which can be manipulated or handled by its system to the address information, and therefore can not extract and use the other information such as a title representative of a main purpose of a memo and a URL of a home page described on the memo so that registered memo images can not be effectively utilized by performing retrieval therein.

The third conventional art is not intended to manage memo images, so that, similar to that of the first conventional art, it is impossible to exchange the memo images among a plurality of users and to retrieve any memo image from a large amount of accumulated memo images. Therefore, it is hard to say the memo images thus acquired are effectively utilized among one or more users.

SUMMARY OF THE INVENTION

In order to address the above-mentioned problem and the other, the present invention has been accomplished. An object of the present invention is to provide a memo image managing apparatus, a memo image managing system and a memo image managing method which are adapted to manage a large amount of accumulated memo images and readily retrieve a predetermined memo image and information therefrom.

To achieve the forgoing and other objects, and according to an aspect of the present invention, there is provided a memo image managing apparatus connectable to an information appliance (e.g., a portable terminal) capable of handling (or manipulating) a memo image, comprising:

a memo image accumulating section adapted to accumulate memo images;

a memo image retrieving section adapted to retrieve a predetermined memo image from the accumulated memo images in response to a request from the portable terminal or the other terminal than the portable terminal;

a character information recognizing section adapted to recognize and extract character information from the memo image; and a memo image distributing section adapted to distribute to the information appliance the memo image retrieved by the memo image retrieving section or the character information extracted by the character information recognizing section.

With this configuration, the memo image managing apparatus can accumulate a lot of memo images which have been obtained by a portable terminal (information appliance) such as a portable telephone or a PHS so that the memo image managing apparatus can perform management and retrieval with respect to a large amount of accumulated memo images in response to a request from the portable terminal or the other information terminal such as a computer system.

The memo image accumulating section in the memo image managing apparatus is characterized by classifying and accumulating the memo images every user of the information appliance. With this configuration, it is possible to accumulate the memo images every user, thereby providing the user with the memo image managing apparatus which is excellent in operability. For example, the memo images are classified and managed every user by using telephone number of the user's portable telephone.

The memo image accumulating section in the memo image managing apparatus is characterized by classifying and accumulating the memo images based on the character information extracted by the character information recognizing section. With this configuration, it is possible to rapidly and readily perform retrieval in the accumulated memo images.

Also, the memo image managing apparatus is characterized by further comprising a character information storing section adapted to store therein the character information extracted by the character information recognizing section in corresponding manner to the memo images. With this configuration, it is possible to manage the memo images in corresponding manner to the character information. For example, the character information storing section is comprised of the memo image accumulating section in an embodiment of the present invention.

Further, the memo image managing apparatus is characterized by further comprising an internet retrieval function section adapted to access a home page on the Internet based on character information in a predetermined memo image and extract information on the home page as a memo image, wherein the memo image accumulating section is adapted to accumulate the information on the home page as one memo image. With this configuration, it is possible for a user to readily take various information pertinent to that memo image out of a memo image.

Furthermore, the memo image managing apparatus is characterized by further comprising a portion adapted to extract graphic information, table information or photograph information from the memo image. With this configuration, it is possible to manage not only the character information but also various information pertinent to that memo image such as graphic information, table information or photograph information.

Also, the memo image managing apparatus is characterized by further comprising a portion adapted to binarize a designated memo image or convert the designated memo image into a thumbnail file for producing its compressed image. With this configuration, it is possible for a user to quickly recognize the memo images accumulated in the memo image managing apparatus and quickly take desired information out of such memo images.

The character information recognizing section is characterized by being equipped with a function to create a character recognition candidate lattice based on the recognition result of the character information in the memo images. With this configuration, it is possible to obtain an accurate character information from the character recognized memo image.

Also, the memo image managing apparatus is characterized by further comprising a managing server which is comprised of the memo image accumulating section, the memo image retrieving section and the memo image distributing section; and a memo image recognizing server which is comprised of the character information recognizing section and which is connectable to the managing server via a communication line. With this configuration, it is possible to alleviate a burden on the memo image managing apparatus.

According to another aspect of the present invention, there is provided a memo image managing system, comprising:

(a) an information appliance including a portable terminal; and (b) a server connectable to the information appliance via a communication line and capable of exchanging, accumulating and retrieving a memo image from the information appliance, the server being comprised of:

(i) a memo image accumulating section adapted to accumulating memo images;

(ii) a memo image retrieving section adapted to retrieve a predetermined memo image from the accumulated memo images in response to a request from the information appliance or the other terminal than the information appliance;

(iii) a character information recognizing section adapted to recognize and extract character information from the memo image; and (iv) a memo image distributing section adapted to distribute to the information appliance the memo image retrieved by the memo image retrieving section or the character information extracted by the character information recognizing section.

With this configuration, the memo image managing apparatus can accumulate a lot of memo images which have been obtained by the information appliance such as a portable telephone or a PHS so that the memo image managing apparatus can perform management and retrieval in a large amount of accumulated memo images in response to a request from the information appliance or the other information terminal such as a computer system.

Also, the server in the memo image managing system is characterized by being comprised of a managing server including the memo image accumulating section, the memo image retrieving section and the memo image distributing section; and a memo image recognizing server connectable to the managing server via a communication line and including the character information recognizing section. With this configuration, it is possible to alleviate burdens on the servers.

Further, the information appliance in the memo image managing system is characterized by including an optical image pickup portion capable of acquiring an image as a memo image containing text information. With this configuration, it is possible to immediately accumulate desired memo image information from the information appliance to the memo image managing system. In accordance with the present invention, the optical image pickup portion or means capable of acquiring an image as a memo image comprises: a digital camera such as a CMOS camera, a CCD camera and the like, a digital video camera, an image scanner and the like. What is meant by the phrase "the information appliance including an optical image pickup portion" is that the optical image pickup portion is embedded in the information appliance or the information appliance is being connected to the optical image pickup portion via an interface of the information appliance.

Furthermore, the information appliance in the memo image managing system is characterized by acquiring the character information recognized by the memo image recognizing section and including a character correcting or varying portion adapted to correct or vary the acquired character information. Then, the information appliance is adapted to distribute the corrected or varied character information to the server so that the server can accumulate the corrected or varied character information as corrected or varied character information. With this configuration, it is possible to correct errors in the character information resulted from the character recognition or remove unwanted information existed in the memo image so that accurate and desired information can be managed.

Also, the server in the memo image managing system is characterized by retrieving the corrected or varied character information obtained by the information appliance as a keyword from a set of accumulated memo images and transmitting the retrieval result as character information or a set of memo images to the information appliance. With this configuration, it is possible to determine a sequential order of the accumulated memo images during display thereof and also to perform a retrieval by using text information, thereby implementing a utilization circumstance of the memo images with ease of operation for a user who utilizes any memo image by using the information appliance.

Further, the information appliance in the memo image managing system is characterized by performing a predetermined call origination, a URL connection or a memory registration by using the character information as a parameter extracted from the memo image acquired from the server. With this configuration, it is possible to utilize information obtained from the memo image conveniently.

Please note that the information appliance can be characterized by being equipped with a transmission function to transmit the memo image together with category information of that memo image. With this configuration, it is possible to more readily set retrieval information to be retrieved by the user. In addition, the information appliance can be characterized by transmitting to the server the memo image together with a key item in associated with that memo image. With this configuration, it is possible to readily set retrieval information to be retrieved by the user.

According to yet another aspect of the present invention, there is provided a memo image managing method of managing memo images by using an information appliance including a portable terminal capable of manipulating the memo images and a managing server connectable to the information appliance via a communication line and capable of performing an exchange, accumulation and retrieval with respect to the memo images transmitted from the information appliance, comprising the steps of:

(a) transmitting the memo image from the information appliance terminal to the managing server;

(b) accumulating the transmitted memo image;

(c) retrieving a predetermined image from the accumulated memo images in response to a request from the information appliance or the other terminal than the information appliance;

(d) recognizing and extracting character information form the memo image, as desired, before or after the step (b) or the step (c); and (e) distributing to the information appliance the retrieved memo image or the recognized and extracted character information. With this configuration, it is possible to accumulate a large amount of memo images obtained by an information appliance such as a portable telephone, a PHS or the like and then to manage and the large amount of memo images and retrieve a required memo image therefrom by using the information appliance, a computer system, or the like.

If an additional retrieval information is transmitted during transmission of the memo image to the managing server, it is possible to more readily retrieve a desired memo image from the memo images accumulated in the managing server. This additional information is at least one selected from the group consisting of position information, an opening condition of the memo image, a category of the memo image and transmission date and hour of the memo image. If such information is transmitted from the information appliance to the managing server, it is also possible to more readily retrieve a desired memo image from the memo images accumulated in the managing server.

These and other aspects of the present invention will be apparent from the following specific description, given by way of example, with reference to the accompanying drawings.

BRIEF DESCRIPTION OF THE DRAWINGS

FIG. 1 is a schematic overall block diagram showing the memo image managing apparatus and memo image managing system according to the present invention;

FIG. 4 shows a list corresponding to memo images as managed information in a managing server;

FIGS. 5(a)-5(b) illustrate one example of retrieved results transmitted to the portable terminal.

FIG. 6 is a schematic diagram showing another embodiment of the present invention;

FIG. 7 illustrates an explanatory diagram explaining a correction of the result obtained through the character recognition by the portable terminal;

DESCRIPTION OF PREFERRED EMBODIMENTS

Figure 2A:
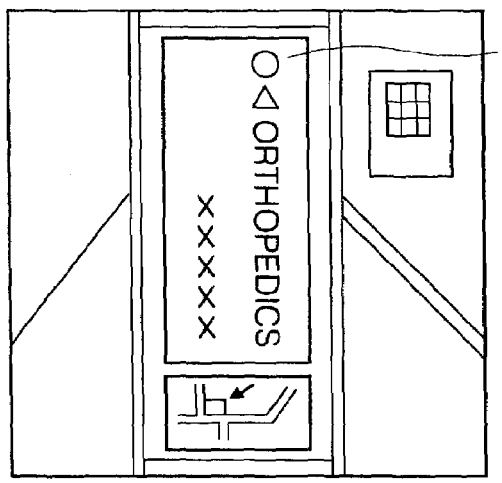
FIGS. 2(a)-2(d) illustrate one example of memo images to be managed according to the present invention.

Hereinafter, A memo image managing apparatus, a memo image managing system and a memo image managing method of preferred embodiments according to the present invention will be described in detail with reference to the accompanying drawings.

Embodiment 1

FIG. 1 is a schematic block diagram showing a memo image managing apparatus and a memo image managing system according to the present invention, FIG. 2 illustrates one example of memo images to be managed according to the present invention, FIG. 3 illustrates retrieval/retrieval information setting screens on a portable terminal; and FIG. 4 illustrates a memo image managing screen for a managing server, which shows a list corresponding to memo images as managed information stored in the managing server.

In FIG. 1, the memo image managing apparatus 100 according to the present invention is server means connectable via communication lines such as the Internet to a portable terminal 1 as an information appliance and comprised of a managing server 2 and a character information recognizing server 3. The managing server 2 comprises: a memo image accumulating section (DB) 21 adapted to accumulating or stored therein memo images; a memo image retrieving section 22 adapted to retrieve a predetermined image from the memo images accumulated in the memo image accumulating section 21 in response to a request issued from the portable terminal 1 or a terminal (not shown) other than the portable terminal 1; and a transmitting/receiving section (distribution section) 23 adapted to conduct a transmission/reception of data and a distribution of the retrieval result. In particular, the memo image managing apparatus 100 and the portable terminal 1 constitutes the memo image managing system according to the present invention.

The character information recognizing server 3 comprises: a dictionary database (DB) 31 storing therein a recognition dictionary; a character information recognizing section 32 adapted to recognize and extract character information from a memo image by using the recognition dictionary; and a transmitting/receiving section (distribution section) 33 adapted to conduct a transmission/reception of data including the memo image to/from the managing server 2 and the portable terminal 1.

In this specification, what is meant by the term "memo image" is electronic data obtained by picking up advertisements, store signs or the like which include character information through an optical image pickup means such as a digital camera. The electronic data are image data such as JPG, PCX, GIF, TIF and BMP which can be displayed on the portable terminal. Also, the memo image may include various data such as map information, graphical data (e.g., a floor plan of real estate), photographs, and illustrations, other than the character information.

The memo image accumulating section 21 adapted to accumulate therein the memo images is storage means, such as a hard disk, a DVDRAM, a DVDR, a CD-R, a CD-RW, an MO or the like, for accumulating or rewrite electronic data, and can accumulate memo images and character information in such a manner that a certain memo image or character information thereof can be extracted through a retrieval operation as described later.

The character information recognizing section 32 is composed of a conventionally known optical character recognition software for converting image data into character information (code information) and a hardware for performing this optical character recognition. This character information recognizing section 32 holds a character recognizing dictionary of a comparatively large capacity as a recognition dictionary. Furthermore, this character information recognizing section 32 may also be configured to conduct a lattice display of the character recognition result and correct it as described later. Needless to say, the memo image accumulating section 21 and the dictionary database 31 may be provided independently of the servers 2 and 3, respectively.

The transmitting/receiving section 23 of the managing server 2 is composed of communication means such as a modem capable of distributing the retrieval result, in response to a request issued from the portable terminal 1 or the other terminal such as a non-shown computer system or L mode-capable stationary telephone set, to a predetermined terminal including another portable terminal other than the portable terminal 1 as above.

The portable terminal 1 is composed mainly of a main portable terminal unit 10 having a communication function (telephone call function), an optical image pickup means 11 such as a digital camera embedded into or connected via an interface to this main portable terminal unit 10, and a local storing section 12 embedded into or connectable to the main portable terminal unit 10 and capable of accumulating electronic data such as memo images.

The main portable terminal unit 10 is comprised of a portable telephone, a PHS, a PDA or the like which includes a non-shown telephone call section and information displaying section. The optical image pickup means 11 comprises a digital camera such as a CMOS camera or a CCD camera, a digital video camera, an image scanner, or the like. In this preferred embodiment, the optical image pickup means 11 is a digital camera embedded into or connected to the portable terminal 1.

Recently, a digital camera that is adapted to be equipped in the main portable terminal unit 10 of the portable telephone has been developed with about 77 thousand pixels as the pixel number at an initial stage of development. However, a digital camera for use in the portable terminal has just been developed with 3 hundred thousand pixels or 4.8 hundred thousand pixels. In the present invention, it is preferable to use such a digital camera 11 embedded into or connected to the portable terminal from the view point of operability, portability or acquirability of memo images.

FIG. 2(a) through FIG. 2(d) illustrate examples showing memo images picked up by the digital camera 11 of the portable terminal 1. FIG. 2(a) shows a memo image of an advertising board that includes text information 51 such as a clinic name of orthopedics (e.g., ○△ orthopedics), a director name of the clinic, an address, a telephone number and a consultant time which form valid information in the memo image.

Figure 2B:
Figure 2C:
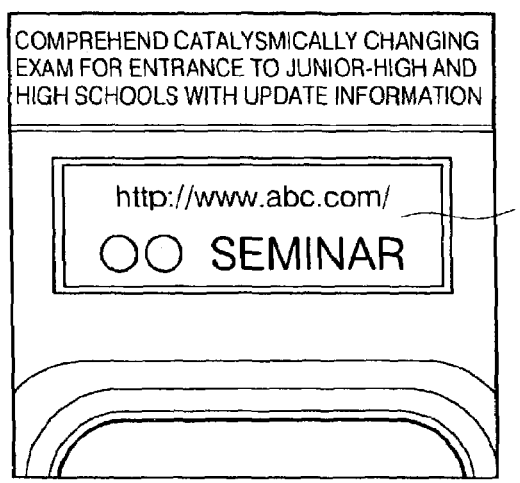
Figure 2D:
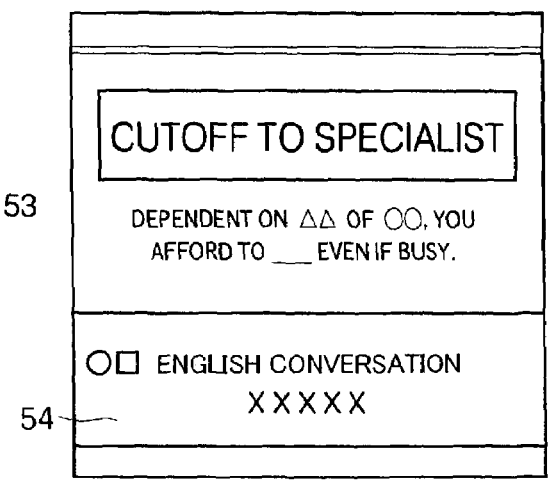

Similarly, FIG. 2(b) shows a memo image including text information 52 concerning ○X△ dental clinic. FIG. 2(c) shows a memo image of ○○ seminar residing at Tokyo that includes a home page address (URL) as text information 53. FIG. 2(d) shows a memo image of ○□ English conversation school that includes its address information as text information 54. In the present invention, a user can acquire his wanted images and text information as memo images by using the digital camera 11 from advertising boards and advertisements existed in towns.

The local storing section 12 is provided to temporarily accumulate memo images thus acquired or is a storing section adapted to accumulate memo images distributed from the managing server 2 as detailed later. For example, the local storing section 12 is composed of a memory embedded in the main portable terminal unit 10 or a rewritable storage device such as a memory card, e.g., a SD card, a smart media card and a compact flash card. The local storing section 12 is smaller in memory capacity than that of the memo image accumulating section 21 provided in the managing server 2.

In this embodiment, a memo image which has been acquired by the portable terminal 1 and includes text information interesting for the user will be firstly accumulated in the local storing section 12. Thereafter, the memo image will be transmitted from the potable terminal 1 to the managing server 2 (an accumulation request of the memo image: arrow 1→2 in FIG. 1). Upon the memo image transmission from the portable terminal 1 to the managing server 2, a plurality of memo images accumulated in the local storing section 12 may be transmitted together as a single unit or a single memo image may be transmitted each time such a memo image is acquired by the portable terminal 1.

Figure 3A:
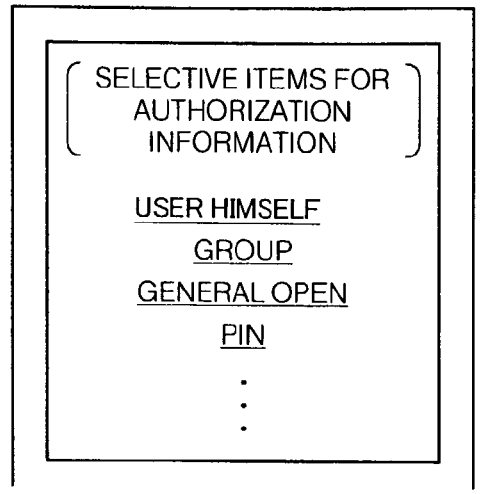
FIGS. 3(a)-3(c) illustrate retrieval/retrieval information setting screens on a portable terminal.
Figure 3B:
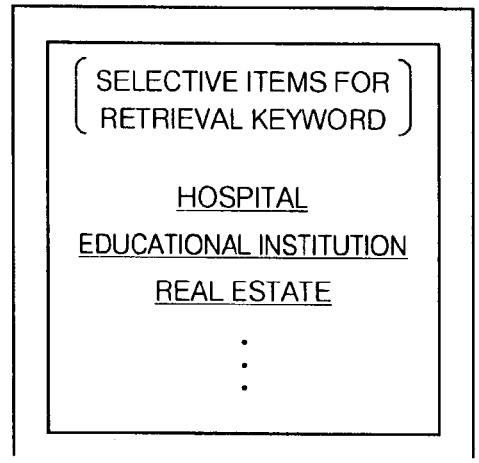

Also, upon the memo image transmission from the portable terminal 1 to the managing server 2, it is possible to simultaneously transmit any memo images selected from accumulation information of the memo images as shown in FIG. 3(a) or FIG. 3(b) for example. FIG. 3(a) is a screen showing perusal authorization information of memo images to be transmitted. A "USER HIMSELF" illustrated in FIG. 3(a) indicates information that only a user himself as an owner of the portable terminal is authorized to retrieve and peruse any memo image.

A "GROUP" indicates information that only predetermined members of the group are authorized to retrieve and peruse any memo image. A "GENERAL OPEN" indicates information that anybody is authorized to retrieve and peruse any memo image without any restriction. In addition, a "PIN (Personal identification Number)" indicates information that the user is authorized to retrieve and peruse any memo image by entering a predetermined PIN (password) thereinto.

FIG. 3(b) illustrates retrieval keyword items to be selected for retrieval of a desired memo image. This retrieval keyword is used to connect the portable terminal 1 to the managing server 2 and then retrieve the desired memo image. There are set for the retrieval keyword various categories such as hospital, educational institution, real estate and the like. For example, if the "hospital" is selected and transmitted to the managing server 2, the memo image retrieving section 22 in the managing server 2 can retrieve from the accumulated memo images memo images corresponding to a classification of the "hospital" category. In addition, the retrieval keyword items may include a memo image acquired date and hour and a memo image acquired place.

Figure 3C:
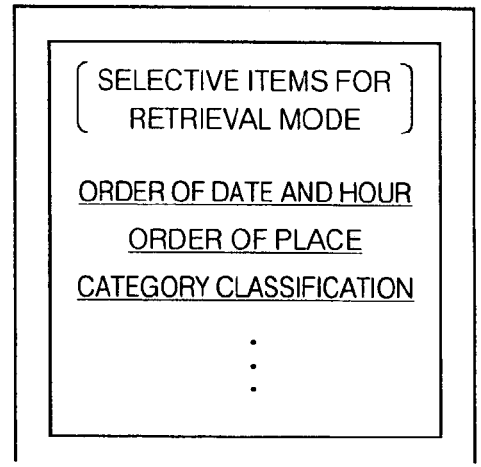

FIG. 3(c) illustrates retrieval mode items to be selected and set for retrieval of any memo image. In the event that any accumulated memo image is retrieved, one of the selective items for retrieval mode such as "order of date and hour", "order of place" and "order of category classification" is selected as desired and transmitted to the managing server 2 so that the managing server 2 will perform a retrieval of any memo image according to the selected and set retrieval mode.

FIG. 4 illustrates managed data on memo images stored in the memo image accumulating section 21. The memo image retrieving section 22 uses the managed data and retrieves any memo image from the memo image accumulating section 21 by a designated retrieval mode (which has been selected in FIG. 3(c)). A set of the retrieval keywords as shown in FIG. 3(b) is only an example. Hence, the user of the portable terminal 1 can enter any desired keyword other than those keywords.

In this way, after the memo image data has been transmitted from the portable terminal 1 to the managing server 2, the user of the portable terminal 1 can delete the memo image data thus transmitted (data relief) so as to prevent an available storage area of the local storing section 12 from being overflown. Therefore, the conventional memory overflow problem can be dissolved according to the present invention.

The managing server 2, which has received the memo image from the portable terminal 1 and has been required for accumulating it therein, registers the managed data of FIG. 4 as a list corresponding to (accumulated) memo images based on various information transmitted to the managing server 2 while accumulating the transmitted memo image in the memo image accumulating section 21.

The managed data (the list corresponding to memo images) as illustrated in FIG. 4 is adapted to manage in a memo image unit various articles such as a telephone number of the portable terminal, a date and hour at which the memo image has been formed (or at which the memo image has been transmitted), an item 1 indicating category classifications (e.g., a hospital, an education and the like), an item 2 indicating geographical information (e.g., a place, an area and the like), a file name of the transmitted memo image, a file name of a text file which has been created as desired by performing the character recognition of the memo image at the character information recognizing section 32 as described later, and an open mode.

In the managed data as shown in FIG. 4, there are exemplified two items of items 1 and 2, but the present invention is not limited thereto. That is, it is possible to arbitrarily add the other kinds of items. Also, the open mode corresponds to perusal restriction information from the portable terminal 1 as shown in FIG. 3(a). This perusal restriction information is managed such that the perusal authorization to the user himself is "1", the perusal authorization to a group is "2" and the general open is "3", for example.

Upon or after creation of the managed data, of the memo image is processed as desired to convert its character information part from image information to text information by the character information recognizing server 3. Also, this conversion from the image information to the text information using the character information recognizing server 3 may be automatically performed by batch processing upon or after storage of the memo image into the memo image accumulating section 21 (the batch processing: an arrow 2→3 as shown in FIG. 1).

Specifically, the managing server 2 can make a request to the character information recognizing server 3 for text information recognition with respect to respective memo images accumulated, for example, in the memo image accumulating section 21. The text recognition result acquired from thee memo image will be return from the character information recognizing server 3 to the managing server 2 and may be added to the managed data (the list corresponding memo images) as a new keyword for retrieval. Of course, the contents of the date and hours, items 1 and 2, etc. of FIG. 4 are created and/or changed based on the transmission information from the portable terminal (or along with the memo image accumulation information), but those contents can also be created and/or changed based on the character information recognition result obtained by the character information recognizing server 3.

On the other hand, the character information recognition by the character information recognizing server 3 is able to be performed not only at a time when the memo image is accumulated but also upon a request from the portable terminal 1. In detail, the portable terminal 1 can make a request to the character information recognizing server 3 for recognition of text information included in a designated memo image (an arrow 1→3 as shown in FIG. 1). In response thereto, the character information recognizing server 3 can perform a conversion from the designated memo image into the text information and then transmit the conversion result (the character recognition result) to the portable terminal 1 (an arrow 3→1 as shown in FIG. 1). In particular, the memo image as manipulated here may be one which has been transmitted directly from the portable terminal 1 to the character information server 3 or one which has been transmitted from the managing server 2 to the character information server 3.

Thus, in this embodiment, a memo image such as a color image which is large in data amount will be able to be manipulated as character information extracted from that memo image, thereby significantly facilitating the manipulating or processing of the memo image Also, it is possible by using a character string in the text information to perform edition and retrieval in associated with the accumulated memo images. For example, it is possible from the portable terminal 1 or the other terminal (including a portable terminal of the other user or the other kind of information appliance) to perform an edition of displayed date and hour in associated with a set of the accumulated memo images and to perform a retrieval in a set of the accumulated memo images by using text information. Therefore, there is implemented a utilization circumstance of the memo images with ease of operation for a user who utilizes any memo image by using the portable terminal 1.

Further, in this embodiment, the portable terminal is not equipped with a recognition function of memo images as a stand-alone type. Instead, the memo image recognizing server is equipped with the recognition function, thereby implementing the memo image recognition with a high accuracy without any limitation imposed by a restricted operation resource of the portable terminal.

Furthermore, a user of the portable terminal 1 or the other terminal, e.g., a portable terminal possessed by the third person can make a request to the managing server 2 for retrieval of a desired memo image (an arrow 1→2 as shown in FIG. 1). The managing server 2 can retrieve the desired memo image based on the managed data accumulated in the database of large scale as shown in FIG. 4 and return it to the portable terminal 1 or the other terminal including the portable terminal of the third person (an arrow 2→1 as shown in FIG. 1).

With this configuration, it is possible to prevent the local storing section 12 from being overflown due to a great deal of memo image accumulation. Simultaneously, the memo images thus accumulated can be used commonly to a plurality of portable terminal users, thereby realizing circulation and exchange of interesting memo images.

Next, second and third embodiments of the present invention will be described with reference to FIG. 5.

Embodiment 2

In this second embodiment as shown in FIG. 5(*a*), the managing server 2 causes the character information recognition server 3 to convert memo images into character information, thereby distributing the character information as a character information list (title list) to the portable terminal 1. Upon selection of a title whose corresponding memo image is desired to be displayed on the portable terminal 1 as shown in FIG. 5(*a*), the memo image entitled the title per se will be displayed on the portable terminal 1, thereby facilitating perusal of the memo image on the portable terminal 1.

Embodiment 3

This third embodiment as shown in FIG. 5(*b*) is an example wherein the retrieval of any memo image is performed by entering the retrieval keyword as explained in FIG. 3(*b*).

In this case, upon input of the keyword "hospital" as a category for retrieval, the managing server 3 retrieves, based on the keyword, text information in association with the "hospital" from the list and then transmit it as a hospital list to the portable terminal 1 for displaying it thereon. Categories in the list corresponding to memo images can simultaneously be transmitted to the managing server 2 along with memo images to be accumulated therein as described with reference to FIG. 3(*b*), or can be attached to the managed data (the list corresponding to memo images) recognized by the character information recognizing server 3. With this configuration, the user who wants to obtain a memo image belonging to a certain category can obtain its wanted memo image more quickly.

Embodiment 4

Next, a fourth embodiment of the present invention will be described with reference to FIG. 6. In this fourth embodiment as shown in FIG. 6, the local storing section 12 of the portable terminal 1 possesses a local database for retrieval. That is, the local storing section 12 has the local database as a list created based on items which has been inputted directly from a user and character information which has been acquired by the character information recognizing server 3 and corrected/changed as desired. Since this database is created based on various character information, the local storing section 12 is not distressed in capacity by the character information as compared with the case of memo images. Thus, the local storing section 12 is equipped with the database in connection with various information interesting a user. If information in association with ones registered in the database is used as a retrieval keyword, it is possible to cause the managing server 2 to perform its corresponding retrieval with ease and to progressionally collect interesting information (memo images or character information).

According to the principle as seen from this fourth embodiment, if a user employs as a retrieval keyword a memo image which has been acquired by his portable terminal 1 and illustrated on an advertising board of a predetermined store, it is possible to retrieve and list memo images in association with that store. For example, if the predetermined store is a Chinese restaurant, it is possible to perform retrieval in advertises, menu, magazine account in connection with that Chinese restaurant. Further, it is possible to acquire a list of different Chinese restaurants or to progressionally collect relevant information.

It would be appreciated that text information within a memo image cannot be perfectly recognized with the current recognition technology. Thus, it is conveniently possible to correct the recognized result such that the character information can become more accurate. Also, it is possible to efficiently obtain character information with correction of the recognized result once obtained as compared with manual typing of that character string. Although the current recognition technology is imperfect, a recognition scheme using a large amount of calculation resources is used so that a recognition error can approach zero as near as possible. As a result, there is a possibility that the character information recognition can be realized with a high accuracy.

Embodiment 5

Next, a fifth embodiment of the present invention will be described.

In this fifth embodiment, the portable terminal 1 is configured to activate usual portable telephone functions such as a call originating function and a telephone number memorizable function by using character information of a designated memo image as a parameter. In the event that a telephone number and a URL address are described in the memo image, the character information recognizing server 3 acquires their text information by performing the character recognition. Then, the recognition result is used to perform a call origination and a memory registration so that the operability of the portable terminal 1 can be improved in efficiency and simplified.

For example, it is possible to extract a telephone number from the memo image as shown in FIG. 2(*a*) or FIG. 2(*b*) and/or to extract a URL from the memo image as shown in FIG. 2(*c*) both by using the character information recognizing server 3. According to the principle as seen from this fifth embodiment, it is possible to memorize them in an embedded memory of the portable terminal 1 (memory registration).

Embodiment 6

In this sixth embodiment, the managing server 2 is configured to classify and accumulate memo images every user of a different portable terminal 1. For example, a different subset-database is created every user of a different telephone number by using the managed data (the list corresponding to memo images). With this configuration, it is possible to accumulate memo images classified every user of the different portable terminal 1 in a large scaled memo image database, thereby allowing each user to accumulate a high-capacity memo image regardless of a capacity size of the local storing section 12 of the portable terminal 1. Since a accumulation place is the large scaled memo image database that is open to public, the memo image databases of one user can be shared with the other user if there is given an authorization from the one user to the other user or can be used for perusal and retrieval in response to a request from the other user.

Embodiment 7

Next, a seventh embodiment of the present invention will be described.

In this seventh embodiment, the managing server 2 is configured to classify and accumulate its accumulated memo image information every category of memo image. For example, this can be achieved by creating a subset-database every category from the managed data as shown in FIG. 4. Since the memo images are classified and accumulated in the large scaled database every memo image category, it is possible to rapidly and readily perform perusal and retrieval of the memo image belonging to a desired category.

Embodiment 8

In an eighth embodiment of the present invention, the managing server 2 is configured to extract a home page information in association with a designated memo image based on character information of a URL or the like of the designated memo image by using an Internet retrieval function and to perform accumulation, exchange and presentation of an image in association with the home page information as a memo image.

For example, from the memo image of an advertisement observed inside of a train, a URL of a home page of an object which is advertised by the advertisement is extracted as text information. Then, the home page specified by the URL is accessed via the Internet to accumulate its content as a memo image. Otherwise, the content is used as a retrieval keyword to perform the retrieval in the large scaled memo image database so that a set of memo images in association with the train advertisement as a first memo image are extracted for presentation thereof to a user. According to the principle as seen from this eight embodiment, it is possible for the user to rapidly and readily acquire a set of memo images in association with a certain memo image.

Embodiment 9

In this ninth embodiment, the character information recognizing server 3 is configured to extract from a designated memo image not only character information but also table information and photograph information such as rules and cells within graphic information and a table. This retrieval processing is performed, for example, by using pattern matching in a technical field of image processing or similarity retrieval in a technical field of computers.

According to the principle as seen from this ninth embodiment, it is possible to extract graphic information and photograph information included in a memo image obtained from a document having a complicated layout such as a magazine or newspaper and picked up by a digital camera, so that structure information within the graph, various information within a table and the photograph can be reused while any retrieval can be performed with those clues to go on.

Embodiment 10

In this tenth embodiment, the character information recognizing server 3 is configured to binarize a designated memo image (a color image or gray scale image) at a high quality or convert the designated memo image into a thumbnail file to compress it for transmission thereof to the managing server 2.

According to the principle of this tenth embodiment, it is possible to convert the color/gray scale memo image of large capacity into the binarized monochrome image of small capacity. That is, it is possible due to binarization technology to decrease a capacity of the color/gray scale memo image to obtain the monochrome memo image of small capacity with available information such as text information, graphic information, table information and photograph information remained therein, thereby implementing exchange and accumulation of such small capacity memo images. Also, it is possible to decrease a capacity of the database and improve an exchange speed of memo image.

Figure 8:
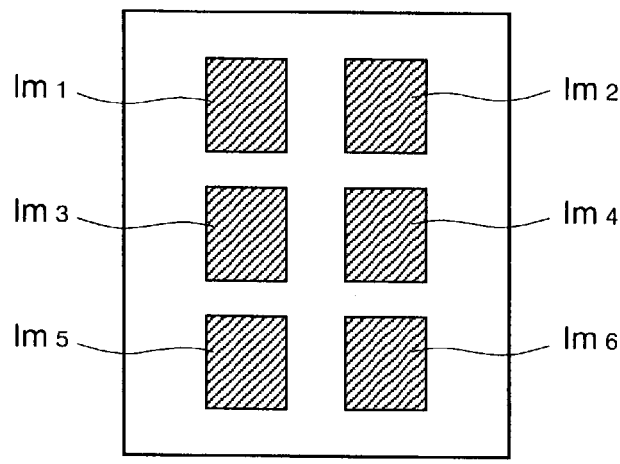
FIG. 8 illustrates thumbnail images of compressed memo images displayed on the portable terminal.

Similarly, it is possible to decrease a size of the color images by forming their thumbnail files and then display a plurality of their memo images on a display screen of the portable terminal 1 as shown in FIG. 8.

Embodiment 11

In this eleventh embodiment as shown in FIG. 7, the character information recognizing section 32 in the character information recognizing server 3 expresses character recognition candidates and character segmentation candidates, as a result of the memo image recognition, by using character candidate lattice so that the character candidate lattice can be exchanged between the portable terminal 1 and the managing server 2.

Specifically, the character candidate lattice means data having a lattice structure including character segmentation candidates and character recognition result candidates of text information which has been obtained by recognizing the text information within the memo image by the character information recognizing section 32.

According to the principle of this eleventh embodiment, even if the recognition result of text information within the memo image includes some errors, the possibility that correct answers are included in the character candidate lattice is high. Therefore, the user can acquire the retrieval result with a high precision by using the character candidate lattice, thereby advantageously improving a retrieval precision of a desired memo image.

In this way, the present invention provides the user with an ease-of-use memo image utilization function because a large amount of memo images can be exchanged and managed independently of processing limit of the portable terminal 1. Also, it is possible to realize the memo image utilization function with a higher performance and functionality by upgrading the version of the memo image managing apparatus or the character information recognizing section without any financial burden on the portable terminal user. Furthermore, it is possible to smoothly exchange any memo image among plural users, thereby advantageously overcoming conventional problems.

Embodiment 12

Next, as a twelfth embodiment, the memo image managing apparatus and an operation of the memo image managing system, i.e., the memo image managing method according to the present invention will be described.

Figure 9:
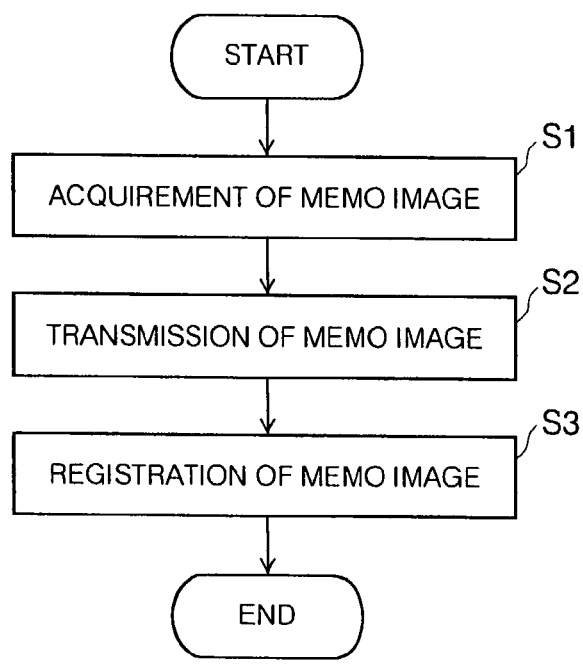
FIG. 9 is a flow chart showing an operation for registering memo images in the memo image managing apparatus by a memo image managing method according to the present invention.
Figure 10:
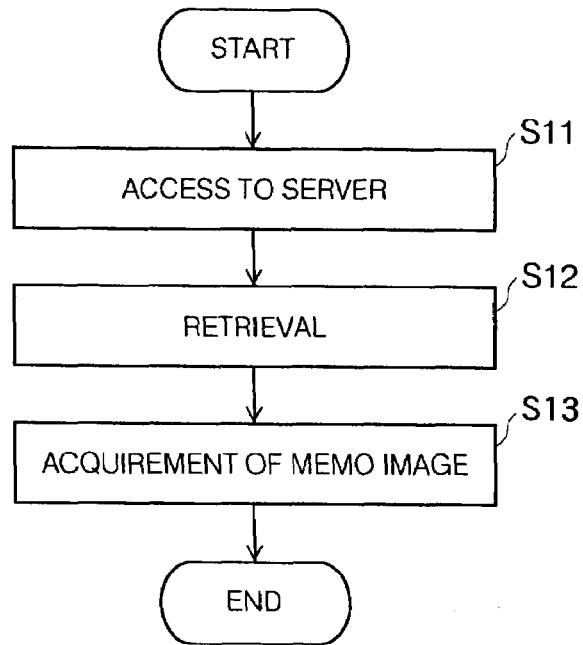
FIG. 10 is a flow chart showing an operation for retrieving a registered memo image by the memo image managing method.

FIG. 9 is a flow chart showing an operation for registering a memo image in the managing server in compliance with the memo image managing method according to the present invention; FIG. 10 is a flow chart showing an operation for retrieving the registered memo image in compliance with the memo image managing method; and FIG. 11 is a flow chart showing an operation for converting the memo image into the character information by the character recognition in compliance with the memo image managing method.

In FIG. 9, the portable terminal 1 acquires a memo image (S1). In detail, a user picks up the memo image as a desired information by the optical image pickup means 11 such as a digital camera. Then, the user transmits the memo image thus acquired from his portable terminal 1 to the managing server via a communication line such as the Internet (S2). At this time, the user can also transmit additional information in association with this memo image that will be henceforth transmitted, e.g., position information, an opening condition of the memo image, a category (or kind) of the memo image and transmission date and hour of the memo image. Finally, the memo image transmitted from the portable terminal 1 is accumulated and stored in the memo image accumulating section 21 in the managing server as a database along with the additional information (S3). In the step of S2 as mentioned above, the user can recover or keep a vacant capacity of the local storing section 12 by deleting the transmitted memo image from the local storing section 12.

To the contrary, the user can retrieve one of the memo images registered in the managing server as described above by using his portable terminal (including a personal computer or a PDA) and acquire the desired memo image. In this case, as shown in FIG. 10, the user employs an information appliance such as a portable terminal to attempt an access to the managing server (S11) and perform a retrieval of the memo image (S12). The retrieval of the memo image is performed as follows: (1) all of the memo images that have been transmitted from the user's portable terminal or the like are retrieved so that the retrieval results will be displayed on the portable terminal; or (2) the retrieval is performed by using as a keyword the additional information in association with and transmitted simultaneously with the transmitted memo image or character information converted from the additional information by the character recognition so that the retrieval results will be extracted. Thus, the memo image information that has been retrieved and extracted by the managing server will be distributed from the managing server to the user's portable terminal or the like. As a result, the user can acquire his desired memo image via his terminal (S13).

Figure 11:
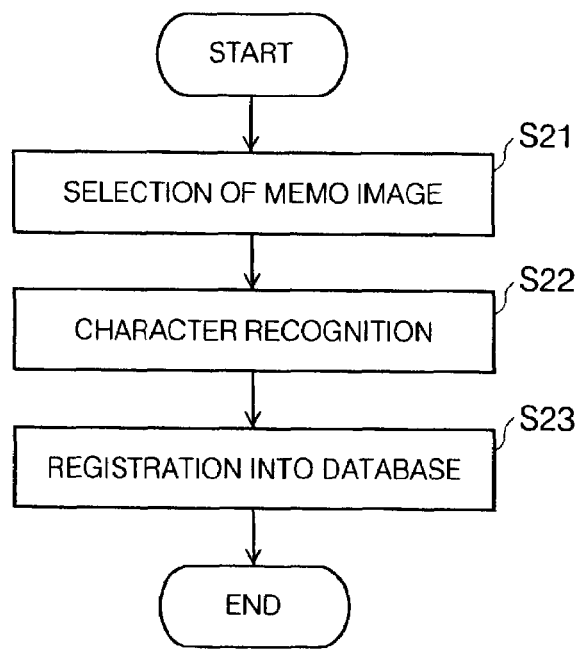
FIG. 11 is a flow chart showing an operation of converting a memo image recognized by the character recognition into character information.

In addition, the memo images accumulated in the managing server are each converted into character information for serving as a retrieval keyword according to the flow chart as shown in FIG. 11. In detail, the portable terminal or the managing server selects a predetermined memo image of a plurality of accumulated memo images (S21). Then, the character recognition of the selected memo image is performed (S22) to create text information from character information included in the memo image. The character information (text) thus created is registered in an accumulating section in the managing server (S23).

In the case that the managing server executes a series of steps of S21 through S23, this can be automatically executed by using a batch system. Also, in the case that the portable terminal executes this series of steps, the character information recognizing server is employed to create a character recognition candidate lattice based on the recognition result of the character information converted from the memo image. In this case, the flow chart as shown in FIG. 11 is configured to include another step for determining a correct candidate by using the character recognition candidate lattice. In this way, the character information created from the predetermined memo image can be effectively utilized in a memo image retrieval flow of steps of S11 through S13.

In each of the memo image managing apparatuses of the embodiments as described above, it is possible to accumulate a large amount of memo images obtained by a portable terminal such as a portable telephone, a PHS or the like and to retrieve and acquire a required memo image from the accumulated memo images as desired by using an information appliance such as the portable terminal, a computer, or the like.

Also, if the memo image managing apparatus is configured in such a manner that the memo images are classified and managed every user, e.g., by using telephone number of the user's portable telephone, a call originator of any memo image can be readily revealed and identified in the event that memo image information is shared among a plurality of users.

Also, if the memo image managing apparatus is configured in such manner that any memo image is classified and managed based on character information extracted from the memo image, the retrieval keyword can automatically be obtained from the memo image as a result of which its management can be readily and rapidly performed.

Further, if the memo image managing apparatus is equipped with an internet retrieval function section adapted to access a home page based on character information in a predetermined memo image and extract information of that home page, a user will be able to readily acquire various information in association with a memo image.

While preferred exemplary embodiments of the present invention have been described above, it is to be understood that further adaptations of the invention described herein can be obtained by appropriate modifications by one of ordinary skill in the art without departing from the scope of the present invention. Accordingly, although preferred configurations of apparatuses, systems, and methods embodying the present invention have been described, it should be understood that these apparatuses, systems, and methods may take on a wide variety of configurations and arrangements without departing from the scope of the present invention.

What is claimed is:

1. A memo image managing apparatus connectable to a plurality of portable terminal devices capable of manipulating a memo image, comprising:

a memo image accumulating section adapted to accumulate memo images;

a memo image retrieving section adapted to retrieve any memo image from said accumulated memo images in response to a request from a portable terminal device of the plurality of terminal devices;

a character information recognizing section adapted to recognize and extract character information from said memo image; and a memo image distributing section adapted to distribute said memo image retrieved by said memo image retrieving section or said character information extracted by said character information recognizing section, to the portable terminal device that originated the request.

2. A memo image managing apparatus as claimed in claim 1, wherein said memo image accumulating section is adapted to classify and accumulate said memo images provided by any portable terminal of said plurality portable terminals.

3. A memo image managing apparatus as claimed in claim 1, wherein said memo image accumulating section is adapted to classify and accumulate said memo images based on said character information extracted by said character information recognizing section.

4. A memo image managing apparatus as claimed in claim 1, further comprising a character information storing section adapted to store therein said character information extracted by said character information recognizing section in corresponding manner to said memo image.

5. A memo image managing apparatus as claimed in claim 1, further comprising an internet retrieval function section adapted to access a home page on the Internet based on character information in a predetermined memo image and extract information on said home page as a memo image, wherein said memo image accumulating section is adapted to accumulate said information on said home page as a memo image.

6. A memo image managing apparatus as claimed in claim 1, further comprising a portion adapted to extract graphic information, table information or photograph information from said memo image.

7. A memo image managing apparatus as claimed in claim 1, further comprising a portion adapted to binarize a designated memo image or convert said designated memo image into a thumbnail file for producing its compressed image.

8. A memo image managing apparatus as claimed in claim 1, wherein said character information recognizing section is equipped with a function to create a character recognition candidate lattice based on the recognition result of said character information in said memo images.

9. A memo image managing apparatus as claimed in claim 1, wherein a managing server comprises said memo image accumulating section, said memo image retrieving section and said memo image distributing section; and a memo image recognizing server comprises said character information recognizing section and which is connectable to said managing server via a communication line.

10. A memo image managing system, comprising:

(a) a plurality of portable terminals; and (b) a server connectable to any portable terminal of the plurality of portable terminals via a communication line and capable of exchanging, accumulating and retrieving a memo image from said portable terminal, said server having:

(i) a memo image accumulating section adapted to accumulating memo images;

(ii) a memo image retrieving section adapted to retrieve any memo image from said accumulated memo images in response to a request from any portable terminal of the plurality of portable terminals;

(iii) a character information recognizing section adapted to recognize and extract character information from said memo image; and (iv) a memo image distributing section adapted to distribute said memo image retrieved by said memo image retrieving section or said character information extracted by said character information recognizing section to the portable terminal that has initiated the request.

11. A memo image managing system as claimed in claim 10, further comprising a memo image recognizing server connectable to said managing server via a communication line and including said character information recognizing section.

12. A memo image managing system as claimed in claim 10, wherein any portable terminal includes an optical image pickup portion capable of acquiring an image as a memo image containing text information.

13. A memo image managing system as claimed in claim 10, wherein appliance any portable terminal acquires said character information recognized by said memo image recognizing sections and includes a character correcting or varying portion adapted to correct or vary said acquired character information, and wherein said portable terminal is adapted to distribute said corrected or varied character information to said server so that said server can accumulate said corrected or varied character information as corrected or varied character information.

14. A memo image managing system as claimed in claim 10, wherein said server is adapted to retrieve a memo image from a set of accumulated memo images by using said corrected or varied character information as a keyword and transmit the retrieval result as character information or a set of memo images to said portable terminal.

15. A memo image managing system as claimed in claim 10, wherein any portable terminal of the plurality of portable terminals is adapted to perform a predetermined call origination, a URL connection or a memory registration by using said character information as a parameter extracted from said memo image acquired from said server.

16. A memo image managing system as claimed in claim 10, wherein any portable terminal of the plurality of portable terminals is equipped with a function to transmit said memo image together with category information of said memo image.

17. A memo image managing system as claimed in claim 10, wherein any portable terminal of the plurality of portable terminals is adapted to transmit to said server said memo image together with a key item in associated with said memo image.

18. A memo image managing method of managing memo images by using a portable terminal from a plurality of portable terminals capable of manipulating said memo images and a managing server connectable to any portable terminal from the plurality of portable terminals via a communication line and capable of performing an exchange, accumulation and retrieval with respect to said memo images transmitted from said portable terminal, comprising:

(a) transmitting said memo image from said portable terminal to said managing server;
(b) accumulating said transmitted memo image;
(c) retrieving an image from said accumulated memo images in response to a request from any portable terminal of the plurality of portable terminals;
(d) recognizing and extracting character information from said memo image, as desired, before or after (b) or (c); and
(e) distributing to said retrieved memo image or said recognized and extracted character information to the portable terminal.

19. A memo image managing method as claimed in claim 18, wherein, during transmission of said memo image to said managing server, additional retrieval information also is transmitted thereto.

20. A memo image managing method as claimed in claim 19, wherein said additional information is at least one selected from the group consisting of position information, an opening condition of said memo image, a category of said memo image and transmission date and hour of said memo image.

* * * * *

UNITED STATES PATENT AND TRADEMARK OFFICE
CERTIFICATE OF CORRECTION

PATENT NO.        : 7,286,722 B2
APPLICATION NO.   : 10/465596
DATED             : October 23, 2007
INVENTOR(S)       : Katsuhito Fujimoto et al.

It is certified that error appears in the above-identified patent and that said Letters Patent is hereby corrected as shown below:

Column 18, Line 28, Claim 13, after "wherein" delete "appliance".

Column 18, Line 30, Claim 13, change "sections" to --section,--.

Column 19, Line 10, Claim 18, after "distributing" delete "to".

Signed and Sealed this

Twenty Second Day of April, 2008

JON W. DUDAS
*Director of the United States Patent and Trademark Office*